April 15, 1958     R. W. TACCONE     2,830,338
CORE BOX

Filed May 9, 1951     3 Sheets-Sheet 1

INVENTOR
RUSSELL W. TACCONE
BY
ATTORNEY

April 15, 1958 — R. W. TACCONE — 2,830,338
CORE BOX
Filed May 9, 1951 — 3 Sheets-Sheet 2
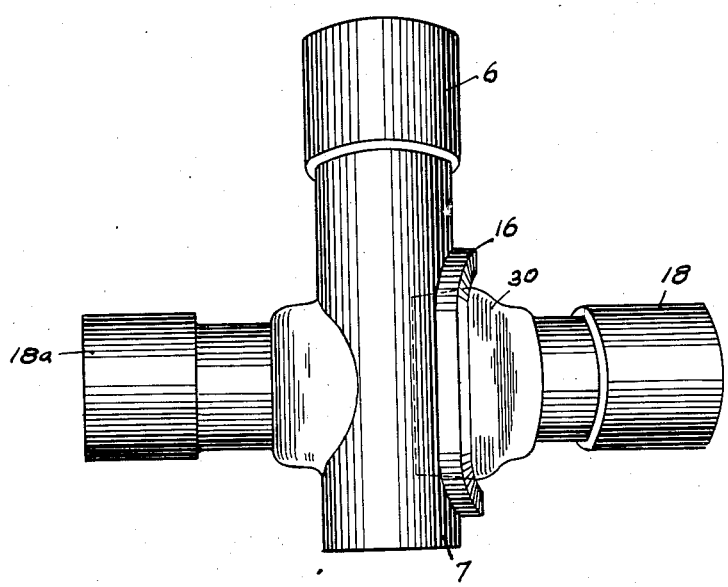
Fig. 4
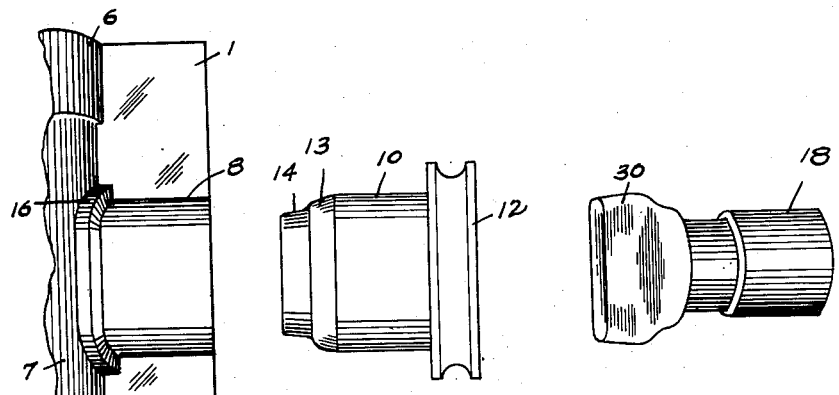
Fig. 5
Fig. 6
INVENTOR.
RUSSELL W. TACCONE
BY
Florian G. Miller
Atty.

INVENTOR.
RUSSELL W. TACCONE
BY
Florian G. Miller
Atty.

United States Patent Office 2,830,338
Patented Apr. 15, 1958

2,830,338

CORE BOX

Russell W. Taccone, North East Township, Erie County, Pa., assignor to Taccone Pneumatic Foundry Equipment Corporation, North East, Pa., a corporation of Pennsylvania Application May 9, 1951, Serial No. 225,380

1 Claim. (Cl. 22—13)

This invention relates generally to a method and means of making a core and more particularly to a method and means of making a core for casting a groove on the interior of a valve body of generally circular form.

Round ring washers have been disposed in the body of a valve in a groove on the end of a sleeve or in some other form of groove for mounting inserted through one of the branches of the valve body inasmuch as it has been impractical to form a groove encompassing a valve inlet by machine or molding methods to nest an O-ring washer, especially one out of round, such as an oblong groove. The necessity of disposing the ring washers on the end of a sleeve requires the use of round ring washers, thereby requiring a large diameter valve for a given flow of fluid therethrough.

It is, accordingly, an object of my invention to provide a novel means and method of forming an oblong groove encompassing an oblong inlet aperture in a valve body for nesting a washer which is simple in construction, economical in cost, economical in manufacture, and efficient in operation.

Another object of my invention is to provide a novel means for forming an oblong tangential groove in a cylindrical body by forming a core to cast same.

Another object of my invention is to provide a novel processing means for making and utilizing cores for casting grooves in valve bodies.

Another object of my invention is to provide a novel core box for making a core to cast a groove on the interior bore of a valve body or any other cylindrical bore.

Other objects of my invention will become evident from the following detailed description, taken in conjunction with the accompanying drawings, in which Fig. 1 shows a plan view of the lower mating half of my novel core box with the cores and draw piece positioned therein;

Fig. 4 is a side elevational view of my novel assembled core for forming the interior of a T-shaped body of a valve with an oblong groove on one side thereof;

Fig. 5 is an exploded view showing a side elevational view of my novel draw piece removed from the mating half of the core box shown in Fig. 1;

Fig. 6 is a perspective view of the core which replaces the draw piece as shown in the assembled core as shown in Fig. 4;

Figures 1, 2:
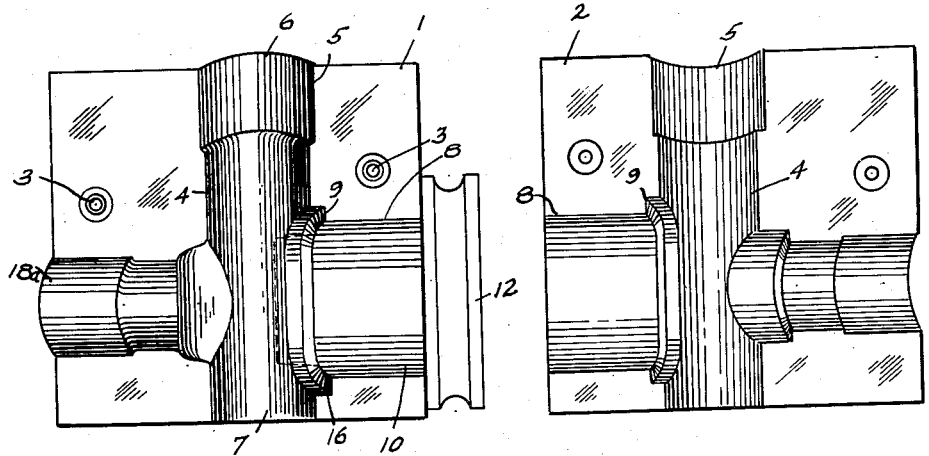
Fig. 2 is a plan view of the upper mating half of my novel core box.
Figure 3:
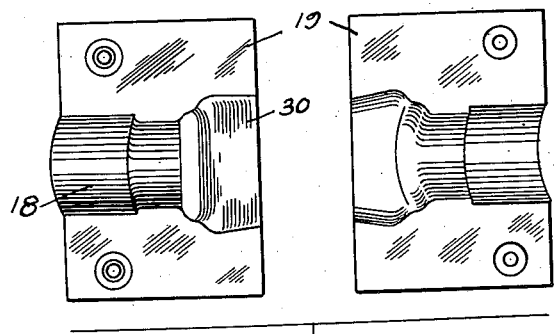
Fig. 3 shows a plan view of mating halves of a core box for forming a core for use in my novel core box shown in Figs. 1 and 2.
Figure 9:
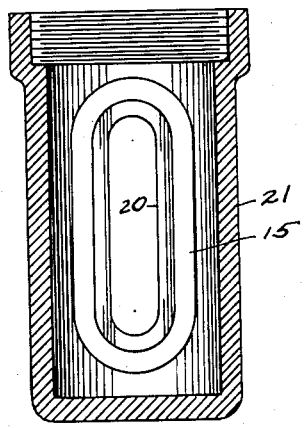
Fig. 9 is a view taken on the line 9—9 of Fig. 7.

Referring now to the drawings, I show in Figs. 1 and 2 identical mating halves 1 and 2 of a core box, secured together by screw bolts 3. The semi-circular shaped grooves 4 and counter-grooves 5 in the mating halves 1 and 2 form a longitudinally extending bore with a counterbore when the mating halves 1 and 2 are secured together to produce an enlarged end 6 on the core 7 shown disposed in mating half 1 in Fig. 1 and separately in Fig. 4. The mating halves 1 and 2 have transverse grooves 8 with marginal grooves 9 forming a laterally extending, oblong shaped aperture having a peripheral groove formed at the terminus thereof and at the juncture thereof with the longitudinal bore formed by the halves 1 and 2. An oblong shaped draw piece 10 having a handle 12 on one end thereof is of the same shape as the oblong aperture formed by the grooves 8 in mating halves 1 and 2, the inner end of the draw piece 10 being tapered at 13 (Fig. 5) and reduced at 14 to extend interiorly of the completed core as shown in Figs. 1 and 4. The outer periphery of the draw piece 10 and the inner periphery of the marginal groove formed by the grooves 9 in mating halves 1 and 2 are spaced a predetermined distance so that the inlet 20 of the valve 21 as shown in Fig. 9 when formed will be spaced from the oblong groove 15 formed in the valve 21 by the projection 16 formed on the core 7 in the core box. The mating halves 19 of a suitable core box provide a core 18 as shown in Fig. 6 with an elongated end 30 which is spaced from the inner side of the annular projection 16 formed on the core 7.

Figure 8:
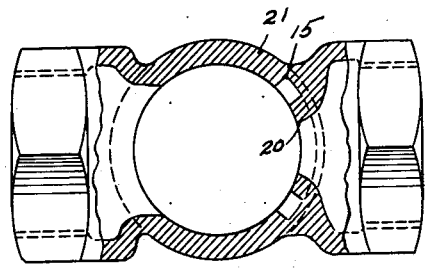
Fig. 8 is a plan view of the valve shown in Fig. 7 with the center portion thereof broken away to show the oblong groove encompassing the inlet formed by my novel core.
Figure 7:
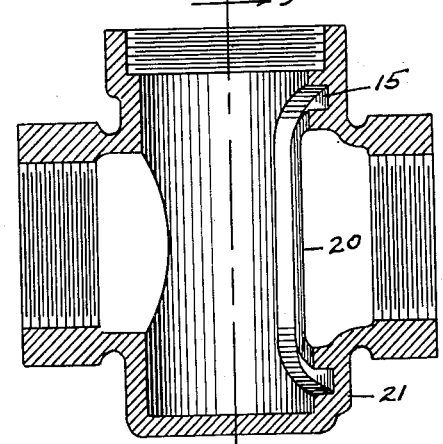
Fig. 7 is a vertical sectional view of the valve body, and particularly the interior thereof, formed by the core shown in Fig. 4.

In the formation of the core shown in Fig. 4, the mated halves 1 and 2 of my novel core box are secured together by screw bolts 3 with the pre-formed core 18a disposed in place as shown in the mating half 1, and the draw member 10 being also disposed in the groove 8 as shown in Fig. 1. Sand is then rammed in the core box in the conventional manner wherein a core as shown in Fig. 1 is formed. The screw bolts 3 are removed and the mating half 2 is removed from the mating half 1 and the draw piece 10 is withdrawn from the core box. The end of a pre-formed core 18 as shown in Fig. 6 is then disposed in the core 7 in place of the draw piece 10 as shown in Fig. 4 with the tapered end thereof being of the same shape as the tapered end of the draw piece 10 so as to position it in a correct position whereby it will provide a space between the outer side thereof and the inner periphery of the projection 16 on the core 7 formed in the core box. By placing the assembled core as shown in Fig. 4 in a conventional mold, a valve body as shown in Figs. 7, 8, and 9 will be formed with a groove 15 encompassing an elongated aperture forming the inlet to the valve, thereby greatly reducing the size of the valve for a given inlet to permit a maximum flow through the valve. The threaded portions of the valve are formed by any conventional machine method and form no part of this invention.

It will be evident from the foregoing description that I have provided a novel core box for forming a novel core to cast a groove on the interior periphery of a bore or valve body with the groove being tangential to the inner periphery or at right angles to the tangent of the periphery of the inner valve body.

Various changes may be made in the specific embodiment of my novel core box or in the method which I have described without departing from the spirit thereof or from the scope of the appended claim.

What I claim is:

A core box for molding a core to form a circular groove in the side wall of a bore in a cylindrical cast fitting comprising two mated halves of a core box, each said half having a semi-circular groove which forms a longitudinally extending bore when said two halves are put together, said halves having a first and a second transverse groove communicating with said longitudinal bore and when said halves are put together forming a laterally extending bore intersecting said longitudinal bore, a marginal groove formed in each said half in the inner surface of said longitudinal bore around said first transverse groove, and a draw piece disposed in said first transverse groove, said draw piece having a reduced size portion extending into said longitudinal bore, said draw piece adapted to be removed and replaced with a branch core having an end similar in shape to said reduced size portion of said draw piece and having a portion smaller in diameter than the corresponding part of said draw piece whereby a space is provided between a portion of sand adapted to be rammed into said core box and formed in said marginal groove and said branch core.

References Cited in the file of this patent

UNITED STATES PATENTS

| | | |
|---|---|---|
| 16,502 | Van Horn | Jan. 27, 1857 |
| 123,329 | Chapman | Feb. 6, 1872 |
| 330,327 | Hildreth | Nov. 10, 1885 |
| 379,672 | Blessing | Mar. 20, 1888 |
| 904,697 | Horne | Nov. 24, 1908 |
| 1,378,524 | Clark | May 17, 1921 |
| 1,990,179 | Gade | Feb. 5, 1935 |

FOREIGN PATENTS

| | | |
|---|---|---|
| 378,085 | Great Britain | Aug. 8, 1932 |